United States Patent
McKee

(10) Patent No.: US 6,598,157 B1
(45) Date of Patent: Jul. 22, 2003

(54) DYNAMIC BOOT BLOCK CONTROL BY BOOT CONFIGURATION DETERMINATION AND SUBSEQUENT ADDRESS MODIFICATION

(75) Inventor: Kenneth G. McKee, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/401,613

(22) Filed: Sep. 22, 1999

(51) Int. Cl.[7] .................. G06F 15/177; G06F 12/10
(52) U.S. Cl. ........................... 713/1; 713/2; 711/202
(58) Field of Search .......................... 713/1, 2; 711/202

(56) References Cited

U.S. PATENT DOCUMENTS

| 4,511,966 A | * | 4/1985 | Hamada | 708/490 |
| 5,325,365 A | * | 6/1994 | Moore et al. | 714/29 |
| 5,445,918 A | * | 8/1995 | Doba et al. | 710/5 |
| 5,689,713 A | * | 11/1997 | Normoyle et al. | 710/263 |
| 5,982,661 A | * | 11/1999 | Kawamata | 365/185.01 |
| 6,119,226 A | * | 9/2000 | Shiau et al. | 713/2 |
| 6,321,332 B1 | * | 11/2001 | Nelson et al. | 713/2 |
| 6,377,486 B1 | * | 4/2002 | Lee | 365/185.11 |

FOREIGN PATENT DOCUMENTS

EP    1253598 A2 * 10/2002 ............ G11C/16/20

* cited by examiner

*Primary Examiner*—Thomas Lee
*Assistant Examiner*—Eric Chang
(74) *Attorney, Agent, or Firm*—Peter Lam

(57) ABSTRACT

A method of accessing memory. The method of one embodiment first receives a first address. The first address is then decoded. A determination is made as to whether the first address indicates a top boot address.

39 Claims, 4 Drawing Sheets

DYNAMIC BOOT BLOCK CONTROL BY BOOT CONFIGURATION DETERMINATION AND SUBSEQUENT ADDRESS MODIFICATION

FIELD OF THE INVENTION

The present invention relates generally to the field of computers and computer systems. More particularly, the present invention relates to a method and apparatus for dynamic boot block configuration.

BACKGROUND OF THE INVENTION

In a typical computer system, a read only memory (ROM) is employed to store non-volatile code that is used to initialize the computer system upon startup and to perform other housekeeping tasks for the computer system. For example, in a personal computer (PC) architecture, a motherboard is equipped with a non-volatile memory device such as a electronically programmable read only memory (EPROM) or a flash memory boot block device that stores Basic Input/Output System (BIOS) code. BIOS code includes software routines that provide a low-level interface to devices in the computer system.

The BIOS is built-in software that determines what a computer can do without accessing programs from a disk. On many PCs, the BIOS contains all the code required to control the keyboard, display screen, disk drives, serial communications, and a number of miscellaneous functions. The BIOS is typically placed in a ROM device that comes with the computer. This type of device is also called a ROM BIOS. This technique ensures that the BIOS will always be available and will not be damaged by disk failures. The BIOS makes it possible for a computer to boot itself. Because random access memory (RAM) is faster than ROM, some computer manufacturers design systems so that the BIOS is copied from ROM to RAM each time the computer is booted. This is known as shadowing.

Many modern PCs have a flash BIOS, which means that the BIOS has been recorded on a flash memory chip, which can be updated if necessary. The PC BIOS is fairly standardized, so all PCs are fairly similar, although there are different BIOS versions. Additional DOS functions are usually added through software modules. Hence users can upgrade to a newer version of DOS without changing the BIOS.

PC BIOS that can handle Plug-and-Play (PnP) devices are known as PnP BIOS or PnP-aware BIOS. PnP BIOS are typically implemented with flash memory rather than ROM. Flash memory devices are typically used for applications requiring non-volatility and in-circuit programmability. Typically, flash memory devices contain separately erasable flash block; namely, each flash block can be erased independently of other flash blocks. To update a particular block, the block is first erased. Data is then written to the erase block.

Flash technology allows blocks of the non-volatile memory to be erased and rewritten without having to remove the flash memory device from the motherboard. In order to prevent the loss of important boot code, certain flash memory devices incorporate a boot block feature. Internal circuits in these memories ensure that all blocks except the boot block are erasable. The controller for these devices typically have two modes of operation: a normal mode and a recovery mode. In the normal mode, the BIOS code contained in the memory is executed. In the recovery mode, the computer system can utilize the code in the boot block section to boot a diskette and rebuild the BIOS code after an error is detected in the BIOS.

Depending on the particular architecture, a processor can be top or bottom boot. The processor boot configuration determines whether the processor is seeking boot code from starting from the bottom of the memory space or from the top. Prior art memory devices are designed to be either top boot or bottom boot. Hence a bottom boot device cannot be used in a top boot system, and vice versa. As a result, memory manufacturers need to include two separate line items in the product line to handle application requirements. Extra time and effort are also spent in design process and manufacturing flow since line items add complexity to the part. Distributors and customers are also force to maintain inventories of two types of memories.

SUMMARY OF THE INVENTION

A method for dynamic boot block configuration is described. The method of one embodiment first receives a first address. The first address is then decoded. A determination is made as to whether the first address indicates a top boot address.

Other features and advantages of the present invention will be apparent from the accompanying drawings and from the detailed description that follow below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
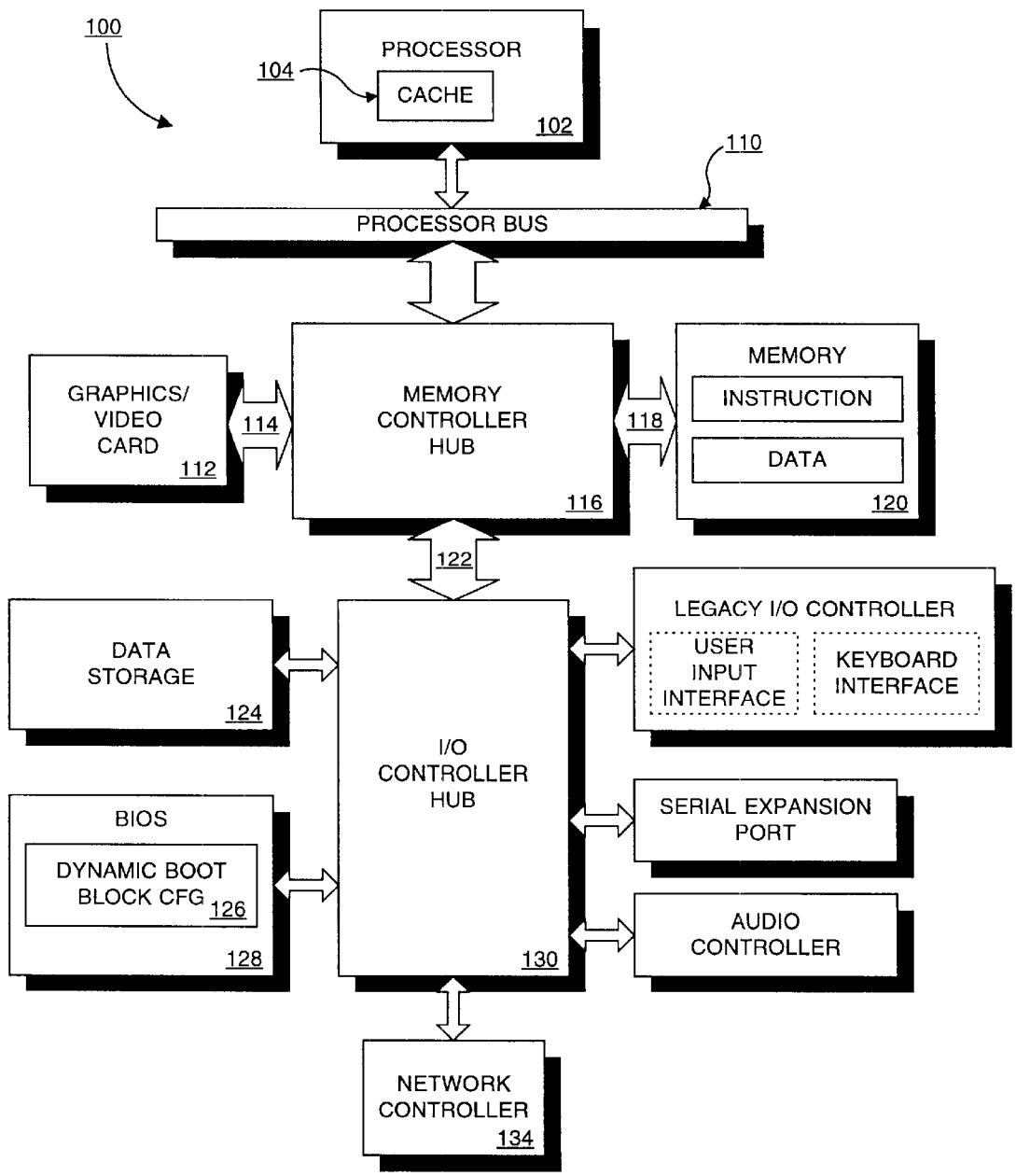
FIG. 1 is a computer system having a dynamic boot block configuration.

A method and apparatus for dynamic boot block configuration is disclosed. The embodiments described herein are described in the context of a nonvolatile writable memory, but is not so limited. Although the following embodiments are described with reference to nonvolatile writable memories and flash memory, other embodiments are applicable to memory devices. The same techniques and teachings of the present invention can easily be applied to other types of systems that use boot memory.

The embodiment of the invention can dynamically configure a boot block flash memory's boot area to the top or bottom of the device address space based upon the address of the first read operation from the device.

With current boot block flash memory components, a specific line item is required for top and bottom boot configurations. This requirement adds complexity to device testing and supply management for flash memory original equipment manufacturers (OEM) and customers. The embodiment of the invention can eliminate the need for two separate line items by providing both boot configurations into a signal component. The dynamic boot configuration of one embodiment uses the address of the first memory read access to configure the boot area to the top or bottom of the memory space in a memory device.

When a system powers up, the processor fetches its first instruction from the boot area within the flash memory component. Data stored in the boot area is referred to as the "system boot code." The processor expects the boot area to be located at either the top or bottom of the processor's address range, depending upon the processor architecture. Some processors boot from the top of memory, while others boot from the bottom of memory. Independent of the boot area location, the processor wants its boot information stored in the boot area. The initial address that the processor supplies to the memory subsystem can therefore be used to inform the memory device where the processor expects to find the boot area.

The flash memory dynamically configures the boot area to the top or bottom of the device's memory address range based on the first address used to access the memory. The first address presented to the flash memory component upon power-up is given access to the boot area if that address is within the top or bottom sector. A sector can be any size such as 8 kilobit, 16 kilobit, 64 kilobit, etc. depending on the embodiment. The memory device including the present enhancement uses the address to set an internal volatile bit that locates the boot area at the top or bottom of the memory space. After this bit is set, the device is configured to a system specific state. The configuration remains in this state until power to the component is removed or reset.

If the first address.in.not within top or bottom sector, the memory device defaults to a standard configuration. One such configuration can be bottom boot in one embodiment.

This embodiment of the invention reduces the number of line items needed on the development plan in order to satisfy the flash memory marketplace and customers. This embodiment also helps to simplify customer inventory management. A single flash memory line item utilizing a method of dynamic boot configuration can service both top boot and bottom boot configuration needs without requiring hardware or software alteration by customers or computer manufacturers. The memory dynamically configures itself to align the system "reads."

Referring now to FIG. 1, there is a block diagram illustrating a computer system 100 that includes the present embodiment. Sample system 100 may dynamically configure a boot block, in accordance with the present invention, such as in the embodiment described herein. Sample system 100 is representative of processing systems based on the PENTIUM®, PENTIUM® Pro, PENTIUM® II, PENTIUM® III microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 1 is a block diagram of a system 100 of one embodiment. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented as a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

A system logic chip 116 is coupled to the processor bus 110 and memory 120. The system logic chip 116 in the illustrated embodiment is a memory controller hub (MCH). The processor 102 communicates to a memory controller hub (MCH) 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling.to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, BIOS 128, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device. A dynamic boot block configuration 126 resides in the flash memory BIOS 128 in this embodiment. In an alternative embodiment, the BIOS 128 may be part of a firmware hub.

The present enhancement is not limited to computer systems. Alternative embodiments can be utilized in applications including cellular phones, personal digital assistants (PDAs), embedded systems, and digital cameras.

One issue in the boot block line of flash products involves the top boot and bottom boot options. When a flash memory manufacturer comes out with a boot block part, the manufacturer automatically needs to have twice as many line items as would be present with a symmetrical part. This condition arises from the need to accommodate both processors that boot from the top of memory and processors that boot from the bottom of memory. Having a large number of line items on the product features list adds to the manufacturing cost. The embodiment of the invention enables a memory device that is generic and dynamically configured for each processor. As a result, the device can be sold to customers that have a processor that boots from the top of memory or from the bottom of memory.

When a processor boots up, information in the flash BIOS is accessed. In some systems, the first address that the processor sends to the flash is either going to be at the top or bottom of the device's memory space. Independent of whether the processor is top boot or bottom boot, the first address generally accesses the boot area because the boot code is located there. Because the first read address is generally targeted towards the boot area regardless of processor architecture, the first address sent to the flash device can be used to configure the boot area to either reside at the top or the bottom of the device memory space.

For example, the boot area in a 16 megabit memory component can be 8 kilobits. The main area of memory would comprise 16 megabits minus 8 kilobits. When power is first applied to the memory component, the boot area may physically reside at the bottom of the memory array. One embodiment of the present enhancement uses a bit entry that indicates whether the read address should be modified. In this embodiment, the address modification comprises inverting the top address bit or the top portion of the address lines such that the boot area appears to be movable.

Figure 2:
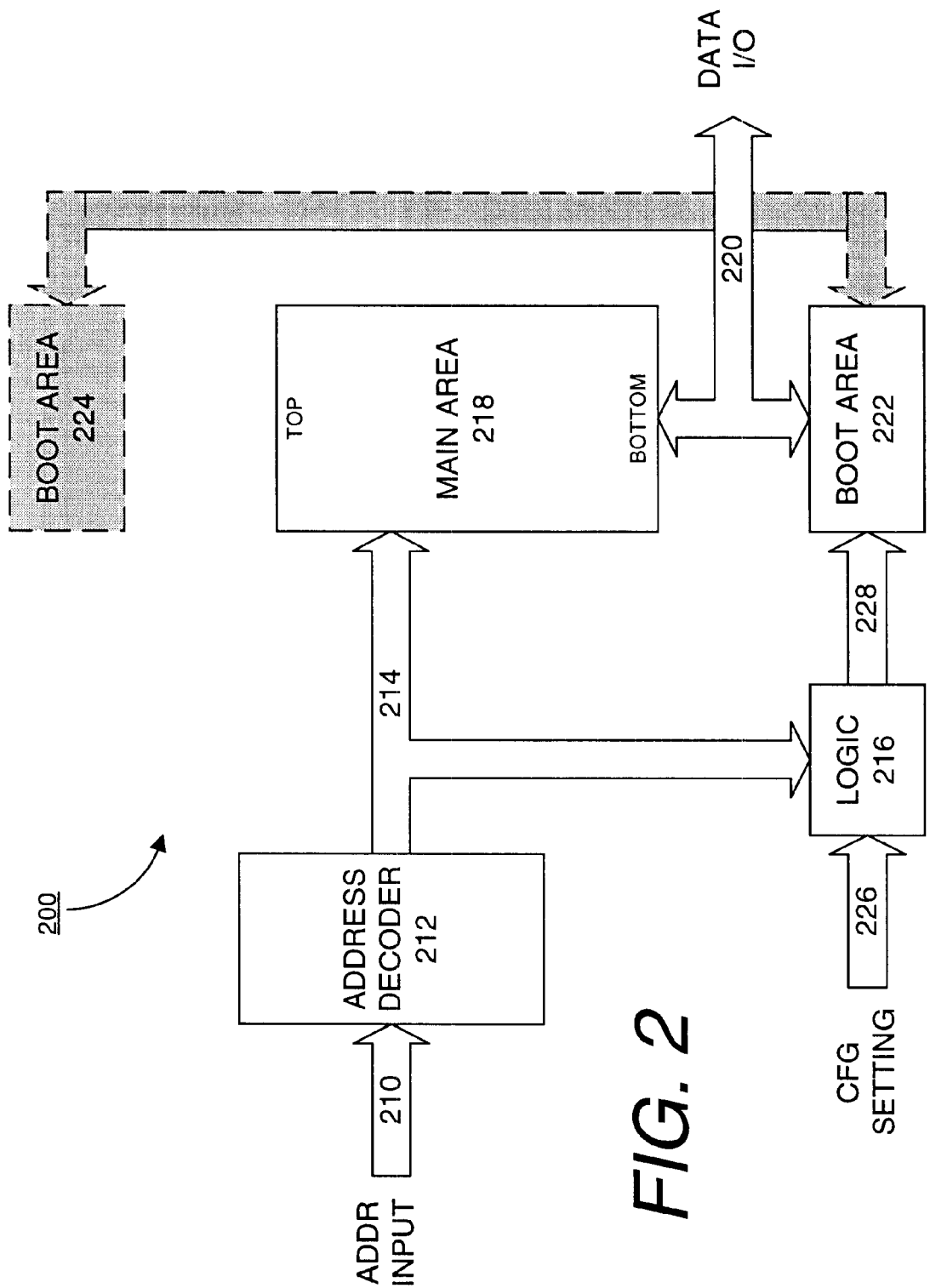
FIG. 2 is a block diagram of an apparatus for dynamically configuring the boot area.

FIG. 2 is a block diagram of an apparatus 200 for dynamically configuring the boot area. Address inputs 210 are coupled to an address decoder 212. Address decoder 212 in some embodiments can include address latches. The decoded address 214 is outputted from address decoder 212 and coupled to logic 216 and main area 218. Also coupled to logic 216 is configuration setting 226. Configuration setting 226 of one embodiment is a volatile boot area configuration bit. The configuration bit 226 indicates whether the system is top or bottom boot. In this embodiment, only memory accesses to the boot area 222, 224 need to be transformed. Memory accesses to blocks in the main area 218 are not used during system boot up and are not affected by the boot configuration.

The address 214 given to the logic 216 determines whether or not there is a need to invert the address lines. In one embodiment, a bottom boot address is 0x00000 and a top boot address is 0xFFFFF. One method to change the location of the boot area 222 from the bottom of the memory space to the top of memory is to invert the address decoding. The decode logic that selects the boot area of the device can manipulate the incoming address. If 0x00000 is sent into the device, the decoding logic would detect that the processor is trying to access the boot area and select the boot block in the component. But if the processor needed to have the boot area at the top of memory, then the internal access logic would need to receive 0xFFFFF to direct the boot area at the opposite end of memory.

Inside the memory device, the address bits are inverted so that instead of selecting the bottom memory location, the top memory location is selected. In this embodiment, configuration bit 226 is set within the component and the boot block is positioned in the memory region. The location placement in this embodiment remains valid until the a reset or power is removed.

Logic 216 of one embodiment comprises of inverters and pass devices. Depending on the configuration setting 226, logic 216 may or may not modify decoded address 214 before the address is propagated to boot area 222, 224. For example, if the memory is designed as a bottom boot part, then the decoded address 214 does not need to be modified or inverted if the part is placed in a bottom boot system. On the other hand, the same bottom boot part in a top boot system may need to have part or all of the decoded address 214 modified or inverted.

Transformed address 228 is outputted from logic 216 and coupled to boot area 222. The transformed address 228 in this embodiment are only used in accessing the boot area 222. In other embodiments, the transformed address 228 may also be applied to memory accesses to the main area 218. Main area 218 is illustrated as having a top region of memory and a bottom region of memory. In FIG. 2, the memory device is designed as a bottom boot part. Boot area 222 in this embodiment is located within the lower region of the memory device. But if the memory device is designed as a top boot part instead, then the boot block would be located physically closer to the top portion of memory as shown by boot area 224. Both the main area 218 and boot area 222 are coupled to data I/O 220.

In existing memory devices, two separate designs are necessary: a top boot capable part and a bottom boot capable part. Most systems that use a boot device are configured for either top boot or bottom boot, but not both. Hence, a system requiring a boot memory is limited to using memory devices having the same boot configuration.

The embodiment of the present invention allows the memory device to dynamically configure the boot block configuration. The boot block capability of the memory device does not have to be limited to a specific boot setting. Instead of having the boot configuration dependent on the physical location of the boot block, a memory device using the present method can serve as a top boot or bottom boot part as needed in the system. The same memory device that performs as a bottom boot part in a bottom boot system can also perform as a top boot part if plugged into a top boot system. The dynamic boot configuration can be achieved seamlessly without the user physically altering or manipulating a system board or jumpers.

Figure 3:
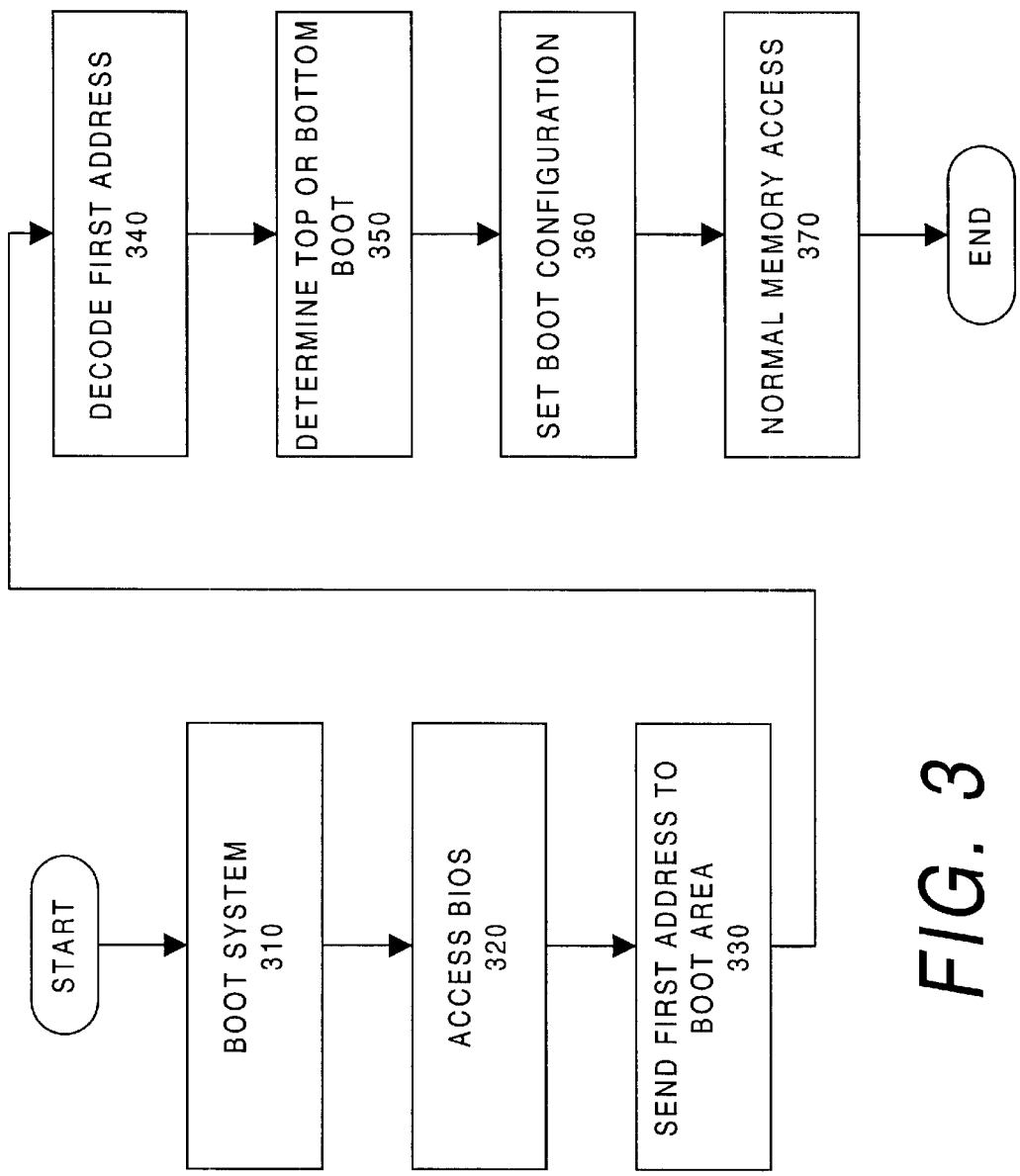
FIG. 3 is a flow chart of a method for dynamically configuring a boot area.

FIG. 3 is a flow chart of a method for dynamically configuring a boot area. The computer system starts to boot up at step 310. Then at step 320, the processor accesses the BIOS. The address of the first memory location to be accessed is sent to the boot area in the memory at step 330. At 340, the address decoder in the memory decodes the first address. Logic at step 350 determines whether the decoded address indicates if the system is designed for top boot or bottom boot. The determination process of one embodiment comprises an evaluation of the first address as to whether the address is within a specific region such as the boot area. The boot configuration of the memory device is set at step 360. In one embodiment, a value is set in a latch to indicate whether all the addresses of future memory accesses after the initial access should be modified.

After the control logic in the BIOS determines whether the system is top or bottom boot, normal operation commences at step 370. The latched boot configuration modifies incoming addresses to properly access the memory. For instance, addresses for memory accesses to the BIOS in a bottom boot system may be not need to be modified and the addresses can be directly access the memory array after being decoded. On the other hand, addresses for memory accesses to the BIOS in a top boot system may need to have certain address bits inverted in order to access the memory array.

In one embodiment, the latched boot configuration remains valid only for each session. The latched configuration is reset upon each system power up or system reset. The boot configuration is dynamically configured each time the memory device is reset. Hence, one design of a memory device can operate in both a top boot system and a bottom boot system.

The first memory access to the component is generally targeted to the boot region. The address is decoded during power-up. The address modification affects all future memory accesses. If the system is powered down and restarted with 0x00000 on the address inputs, and the part is swapped into another system with 0xFFFFF on boot then the part becomes top boot. Hence the boot block location is swapped. The memory region is rearranged based upon the boot configuration. If the first address wants to retrieve information from the top of memory, then the processor needs a top boot component. The logic will send the address to a memory location at the top of memory. The boot block will be positioned at the top of virtual memory space. The switched memory space will be transparent to the system. While power is left on to the component, this boot configuration remains.

Now if 0x00000 was applied on the address inputs, then the block is configured for bottom boot. But if the first read address is within the middle of the component, then the processor does utilize the boot block architecture. In one embodiment, the part will default to the bottom of the component. If the first address is either of the top or bottom, then the processor or system values the boot block feature set. A memory device capable of dynamic boot configuration can position the boot area to align with the first address at the top or bottom of the memory space. The address would cause an entry to be set within the component that would indicate to the decode logic whether to position the boot block at the top or bottom of the memory space. For one embodiment, the main memory area remains the same.

For one embodiment, only certain addresses bits are evaluated. These are the address bits related to the block selects. When a system is booting up, the first address may not be a specific address such as 0x00000 or 0xFFFFF, but more of within a certain region. The address range of the boot location could also be dependent on the particular system. For example, a component may have 64 kilobit size blocks. If the decode logic determines that an address is located within a 64 kilobit boundary on the top of memory space, then the boot block is positioned at the top. If the address is on the bottom, then the boot block is located at the bottom of the memory region. The memory device of one embodiment does not analyze addresses subsequent to the first read address for determining the boot configuration.

Figure 4:
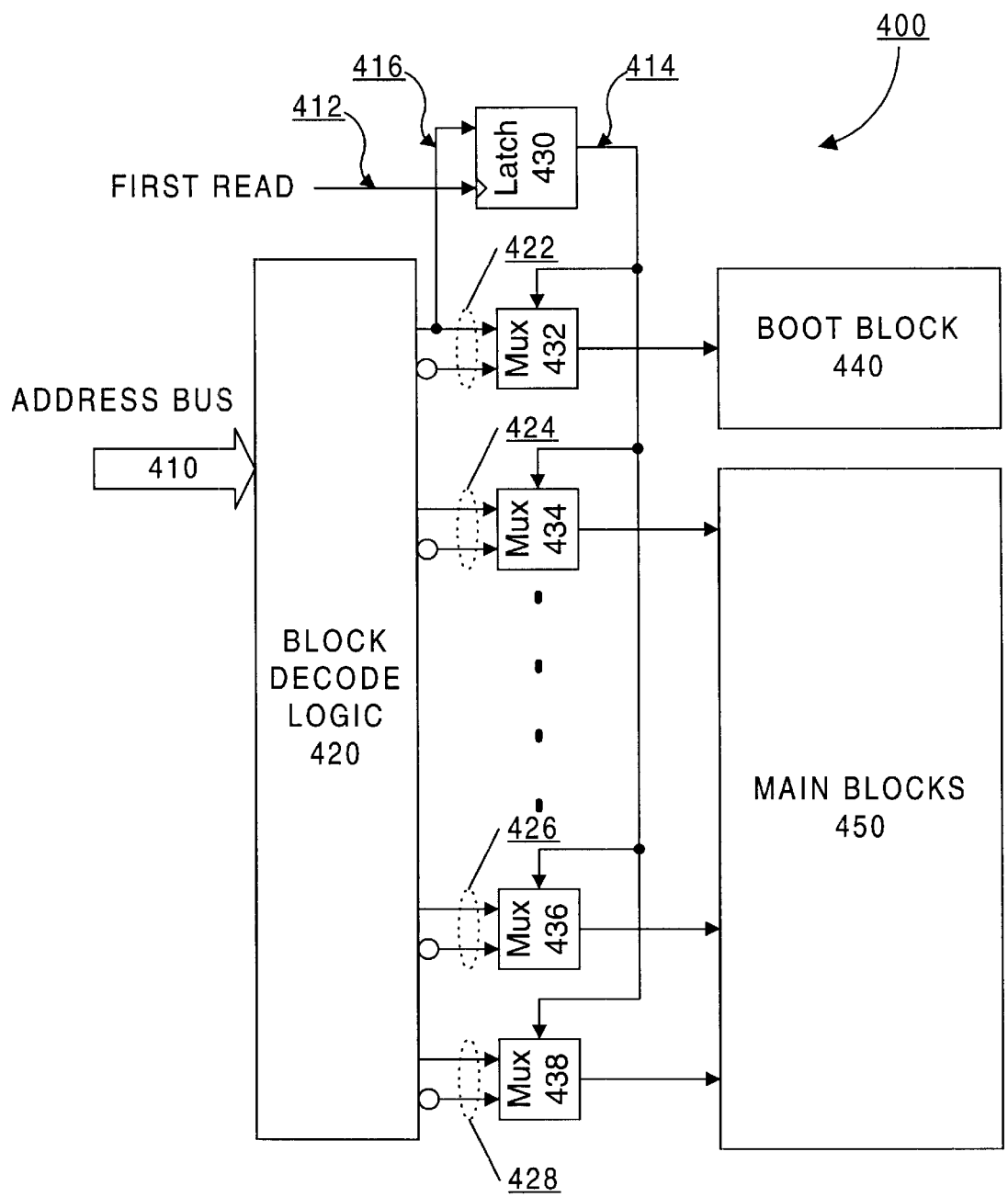
FIG. 4 is an apparatus for dynamically configuring the boot area in one embodiment.

FIG. 4 is an apparatus 400 for dynamically configuring the boot area in one embodiment. An address bus 410 is coupled to block decode logic 420. Address bus 410 comprises of a number of address bits that are used to access the memory array. Block decode logic 420 decodes the address from the address bus 410 and outputs both the inverted and non-inverted versions 422, 424, 426, 428 of each of the decoded address bits. Outputs 422, 424, 426, 428 from the decode logic 420 are coupled to muxes 432, 434, 436, 438.

In some systems, certain address-bits are inverted between top and bottom boot. For instance, a top boot address may be 0xFFFFF. But a bottom boot address in a similar system would be 0x00000. In the present example, one of the address bits 416 is also coupled as an input to latch 430. This address bit 416, which also serves as the boot block decode signal in this embodiment, indicates whether the system is seeking a top boot or bottom boot memory device. The FIRST READ signal 412 is also coupled to latch 430. For this embodiment, a logic high on the boot block decode signal 416 indicates a top boot address and a logic low indicates a bottom boot address. Apparatus 400 uses FIRST READ 412 to indicate whether the current memory access is the first read of the memory device. The FIRST READ signal 412 acts as the latch enable signal on latch 430. When FIRST READ 412 is at a high logic level, latch 430 is enabled and the input to the latch, boot block decode signal 416 in this example, is latched. After the first memory read, the FIRST READ signal 412 transitions to a logic low.

The output 414 of latch 430 is coupled to a series of muxes 432, 434, 436, 438 as the input selector. The apparatus 400 of FIG. 4 shows only four muxes 432, 434, 436, 438. The number of muxes used in each embodiment is application specific. In one embodiment, all decoded address bits are coupled to muxes. In an alternative embodiment, only a few and not all of the decoded address bits are coupled to muxes. The outputs of the muxes 432, 434, 436, 438 are coupled to the boot block 440 and the main blocks 450 of the memory device. Depending on whether latch output 414 is a logic high or a logic low, either the inverted or non-inverted address bit 422, 424, 426, 428 at muxes 432, 434, 436, 438 is selected and outputted to the memory array. The mux outputs taken together form a memory address. Hence, the address bits can be dynamically modified to accommodate a top boot or bottom boot configuration.

During the first read operation after boot-up in one embodiment, the flash memory block decode logic 420 latches the status of the boot block decode signal 416. If the signal 416 is asserted, then the processor wants to read information for the boot block area 440 from the top of memory. This latched signal 414 configures the mux 432, 434, 436, 438 to pass through the decoded signals 422, 424, 426, 428 as is.

On the other hand, if the boot block decode signal 416 is not asserted, then the processor is assumed to be accessing information from the main blocks 450 of memory. In this case, the latched signal 414 directs the mux 432, 434, 436, 438 to pass through the inverted decode signals, placing the boot block area 440 at the bottom of memory. The memory device of one embodiment does not analyze addresses subsequent to the first read address for determining the boot configuration.

In the foregoing specification, the invention has been described with reference to specific exemplary embodiments thereof. It will, however, be evident that various modifications and changes may be made thereof without departing from the broader spirit and scope of the invention as set forth in the appended claims. The specification, and drawings are, accordingly, to be regarded in an illustrative rather than a restrictive sense.

What is claimed is:

1. A method of accessing memory comprising:
   receiving a first address for a first memory access to said memory;
   decoding said first address;
   determining a boot configuration based on whether said first address indicates a top boot address or a bottom boot address; and
   setting a value based on said boot configuration to indicated whether any address bit for each subsequent access to said memory needs to be modified.

2. The method of claim 1 wherein said first address corresponds to a location within a boot region of said memory.

3. The method of claim 1 further comprising setting a boot configuration entry.

4. The method of claim 3 further comprising storing said boot configuration entry in said memory.

5. The method of claim 3 wherein said boot configuration entry is reset upon a system reset.

6. The method of claim 1 wherein said determining occurs during a system boot sequence.

7. The method of claim 1 further comprising determining if said first address indicates a bottom boot address.

8. The method of claim 3 further comprising modifying addresses of subsequent memory accesses based upon said boot configuration entry.

9. The method of claim 3 further comprising modifying addresses of subsequent memory accesses to a boot area based upon said boot configuration entry.

10. The method of claim 1 wherein said memory is a BIOS.

11. The method of claim 1 wherein said memory is a firmware hub.

12. The method of claim 1 wherein said memory is a flash memory.

13. The method of claim 1 wherein said determining comprises analyzing said first address as to whether said first address fits in a specified region.

14. A method of dynamically configuring a boot block comprising:
   receiving a first address for a first memory access to said boot block;
   decoding said first address;
   determining a boot configuration from said first address, wherein a bottom boot configuration is indicated if said first address is a bottom boot address and a top boot configuration is indicated if said first address is a top boot address;
   setting a boot configuration entry in response to said determination; and
   modifying addresses of subsequent memory accesses based on a value in said boot configuration entry if said value indicates said boot configuration is not a default boot configuration.

15. The method of claim 14 wherein said boot configuration entry is reset during a memory reset.

16. The method of claim 14 wherein said determining occurs during a system boot.

17. The method of claim 14 wherein said first address corresponds to a location within a boot region of memory.

18. The method of claim 14 wherein said memory accesses are accesses to a boot area.

19. The method of claim 14 wherein said determining comprises analyzing said first address as to whether said first address fits in a specified region.

20. An apparatus for accessing memory comprising:
   an address input;
   configuration logic coupled to said address input, said configuration logic for dynamically determining a boot configuration based on a first address on said address input, wherein a bottom boot configuration is requested if said first address is a bottom boot address and a top boot configuration is requested if said first address is a top boot address; and
   decode logic coupled to said configuration logic, said decode logic to modify one or more bits of an address of a subsequent memory access to said memory if said boot configuration is different from a default boot setting.

21. The apparatus of claim 20 further comprising storing said boot configuration.

22. The apparatus of claim 20 wherein said address input corresponds to a location within a boot region.

23. The apparatus of claim 20 wherein said subsequent memory access is an access to a memory location in a boot region.

24. The apparatus of claim 20 wherein said determining occurs during system boot.

25. The apparatus of claim 20 wherein said boot configuration is reset during device reset.

26. The apparatus of claim 20 wherein said memory is a BIOS.

27. The apparatus of claim 20 wherein said memory is a firmware hub.

28. The apparatus of claim 20 wherein said memory is a flash memory.

29. The apparatus of claim 20 wherein said determining comprises analyzing said first address as to whether said first address fits in a specified region.

30. An apparatus for dynamically configuring a boot block comprising:
   an input for addresses, said addresses for accessing a memory space;
   address decode logic coupled to said address inputs, said decode logic outputting a first decoded address bit;
   a latch coupled to a first decoded address bit, said first decoded address bit indicating a boot configuration for said boot block, said latch outputting a select signal;
   a mux coupled to a first decoded address bit and to said select signal, said select signal controlling whether said first decode address bit is to be inverted when outputted from said mux, output of said mux comprising a second address bit; and
   a memory array coupled to said mux, said second address bit addressing locations in said array, said memory array comprising a boot block.

31. The apparatus of claim 30 wherein said address decode logic comprises block decode logic.

32. The apparatus of claim 30 wherein said address decode logic outputs both non-inverted and inverted versions of decoded address bits.

33. The apparatus of claim 30 wherein a control signal is coupled to said latch, said control signal enabling latching of said first decoded address bit.

34. A digital processing system comprising:
   a processor;
   a memory controller hub coupled to said processor; and
   a memory coupled to said memory controller hub, said memory comprising
     an address input;
     configuration logic coupled to said address input, said configuration logic for dynamically determining a boot configuration based on a first address on said address input, wherein a bottom boot configuration is requested if said first address is a bottom boot address and a top boot configuration is requested if said first address is a top boot address; and
     decode logic coupled to said configuration logic, said decode logic to modify one or more bits of an address of a subsequent memory access if said boot configuration is different from a default boot setting.

35. The digital processing system of claim 34 wherein further comprising an I/O controller hub coupled to said memory controller hub.

36. The digital processing system of claim 34 wherein said memory is a flash memory.

37. The digital processing system of claim 34 wherein said memory is a BIOS.

38. The digital processing system of claim 34 wherein said memory is a firmware hub.

39. The digital processing system of claim 34 wherein said determining comprises analyzing said first address as to whether said first address fits in a specified region.

\* \* \* \* \*